United States Patent [19]
Beaman

[11] Patent Number: 5,826,987
[45] Date of Patent: Oct. 27, 1998

[54] MOUNTING OF A SHAFT WITHIN A HOUSING

[75] Inventor: Michael D. Beaman, Torrington, Conn.

[73] Assignee: The Torrington Company, Torrington, Conn.

[21] Appl. No.: 898,233

[22] Filed: Jul. 22, 1997

Related U.S. Application Data

[63] Continuation-in-part of Ser. No. 833,108, Apr. 4, 1987, abandoned.

[51] Int. Cl.⁶ .................................................... F16C 27/00
[52] U.S. Cl. ............................................. 384/517; 384/536
[58] Field of Search .................................... 384/504, 505, 384/512, 517, 518, 536, 538, 503; 74/492

[56] References Cited

U.S. PATENT DOCUMENTS

| | | |
|---|---|---|
| 918,600 | 4/1909 | Schacht . |
| 4,606,658 | 8/1986 | Hofmann et al. ........................ 384/510 |
| 4,979,834 | 12/1990 | Speich .................................. 384/518 X |
| 5,193,917 | 3/1993 | Adler et al. .............................. 384/517 |
| 5,458,422 | 10/1995 | Zernickel et al. ....................... 384/505 |
| 5,531,526 | 7/1996 | Labedan et al. ......................... 384/518 |
| 5,538,282 | 7/1996 | White et al. ............................. 280/779 |
| 5,609,423 | 3/1997 | Jurik et al. .............................. 384/518 |

*Primary Examiner*—Thomas R. Hannon
*Attorney, Agent, or Firm*—John C. Bigler

[57] ABSTRACT

An angular contact bearing is mounted within a housing and a shaft is positioned within the bearing such that an annular space is provided between the bearing and the shaft. A mounting ring of elastomeric polymer is positioned over the shaft and against the bearing inner ring such that a portion of the mounting ring is between the bearing inner ring and the shaft, centering the shaft within the bearing and reducing radial free play. The mounting ring is compressed axially, against the bearing, such that the mounting ring deforms and resiliently spreads radially outwardly and provides a preload on the bearing balls.

11 Claims, 3 Drawing Sheets

MOUNTING OF A SHAFT WITHIN A HOUSING

This application is a continuation-in-part of application Ser. No. 08/833,108, filed Apr. 4, 1997, now abandoned.

BACKGROUND OF THE INVENTION

This invention relates generally to the mounting of a rotatable shaft within a housing and, more particularly, to a mounting suitable for a steering column shaft.

Typically, automotive tilt steering columns require a spring preload to eliminate axial free play and a steel tolerance ring to eliminate radial free play. Currently, a steel coil spring or wave type spring is used in combination with a steel or plastic tolerance ring. This mounting arrangement requires a great amount of axial space and introduces variations in torque-to-rotate. Additionally, such mounting arrangements allow trans-mission of noise and vibration to or from the shaft, through the bearing.

The foregoing illustrates limitations known to exist in present devices and methods. Thus, it is apparent that it would be advantageous to provide an alternative directed to overcoming one or more of the limitations set forth above. accordingly, a suitable alternative is provided including features more fully disclosed hereinafter.

SUMMARY OF THE INVENTION

In one aspect of the invention, this is accomplished by providing a method of mounting a shaft within a housing. An angular contact bearing is mounted within the housing and a shaft is positioned within the bearing such that an annular space is provided between the bearing inner ring of the bearing and the shaft. A mounting ring of elastomeric polymer is positioned over the shaft and against the bearing inner ring such that a wedge-shaped portion of the mounting ring is within the annular space between the bearing inner ring and the shaft, thereby centering the shaft within the bearing inner ring and reducing radial free play. The mounting ring is compressed axially, against the bearing inner ring, such that the mounting ring deforms and resiliently spreads radially outwardly and provides a preload on the bearing balls.

In another aspect of the invention, this is accomplished by providing an assembly comprising an angular contact bearing mounted within a housing and a shaft located concentrically within a central annular aperture of the bearing inner ring of the bearing such that an annular space is provided between the bearing inner ring and the shaft. A mounting ring of elastomeric polymer, having a wedge-shaped portion located within the annular space, is compressed axially between the bearing inner ring and a stop means on the shaft such that the mounting ring is resiliently spread radially outwardly and a preload is exerted on the bearing balls.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
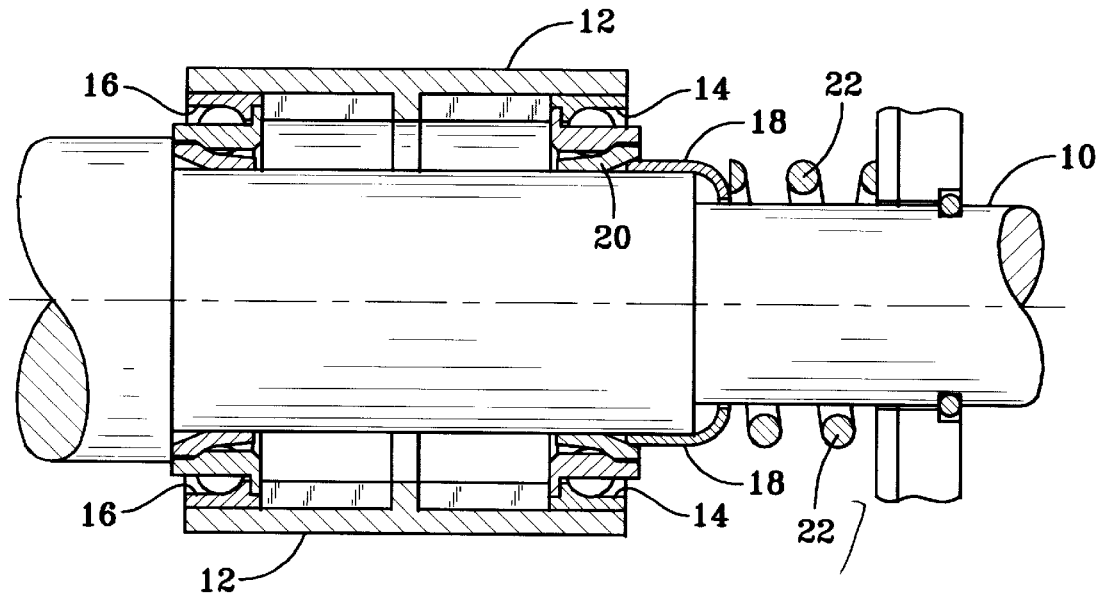
FIG. 1 is a sectional view of a shaft mounted within a housing illustrating the prior art.

Referring now to the drawings, FIG. 1 illustrates shaft 10 mounted within housing 12 by angular contact bearings 14 and 16. Steel tolerance ring 18 is split or segmented so that it can close radially inwardly against shaft 10 and under a tapered portion of bearing inner ring 20 of angular contact bearing 14 to reduce radial free play between shaft 10 and bearing inner ring 20. Steel coil spring 22 provides an axial preload on angular contact bearings 14 and 16 by pressing axially against steel tolerance ring 18.

Figure 2:
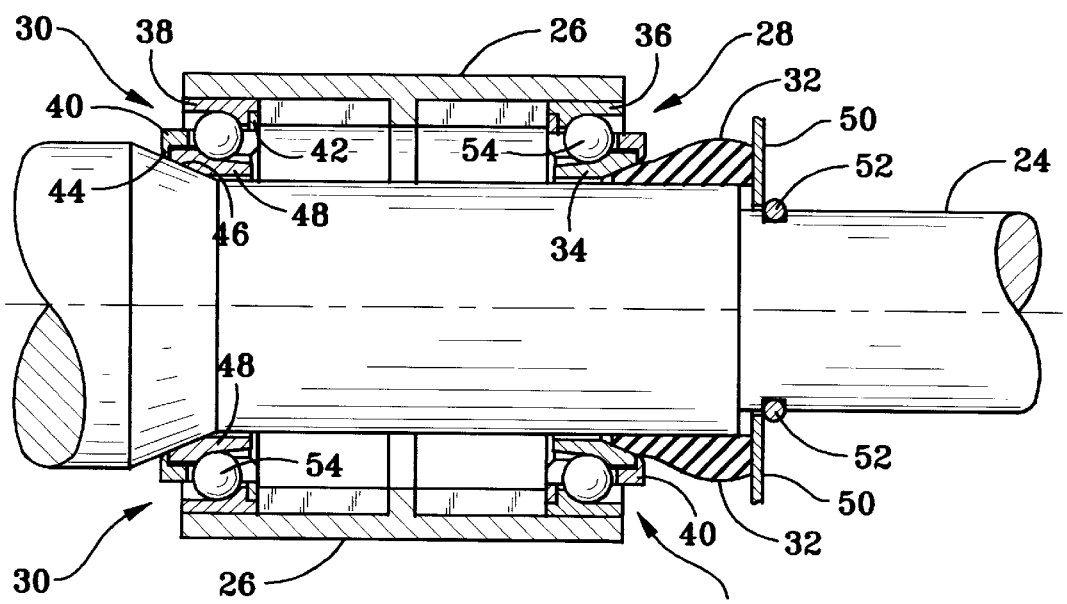
FIG. 2 is a sectional view of a shaft mounted within a housing, illustrating a first embodiment of the present invention.

FIG. 2 illustrates a first embodiment of the present invention having shaft 24 mounted within housing 26 by angular contact bearings 28 and 30 that form a clearance fit with the shaft. Mounting ring 32, formed of an elastomeric polymer, is located against bearing inner ring 34 of angular contact bearing 28, such that a wedge-shaped portion of mounting ring 32 is between bearing inner ring 34 and shaft 24. As a result of this positioning of mounting ring 24, radial free play of the shaft is reduced and the shaft is centered and isolated from contact with the housing and bearings, reducing transmission of noise and vibration to or from the shaft.

Preferably, angular contact bearings 28 and 30 are mounted within housing 26 before inserting (or sliding) shaft 24 into position within the bearings. Various mounting means may be used; for example, bearing outer rings 36 and 38 may be press-fit into housing 26 axially inwardly against a shoulder of housing 26. For convenience, angular contact bearings 28 and 30 may include bearing retainers 40 with radially extending flanges or tabs 42 and 44 that hold the bearings together as a subassembly prior to mounting of shaft 24 and application of a preload.

In the embodiment of FIG. 2, shaft 24 has radially outwardly tapered annular shoulder 46 that engages a mating tapered inner surface of bearing inner ring 48 of angular contact bearing 30. Annular washer 50, held by snap ring 52, or other stop means compresses mounting ring 32 axially, against bearing inner ring 34. As a result of this axial compression, mounting ring 32 deforms and resiliently spreads radially outwardly and provides a preload on bearing balls 54 of angular contact bearings 28 and 30, acting through housing 26 and resisted by engagement of bearing inner ring 48 with annular shoulder 46.

Figure 3:
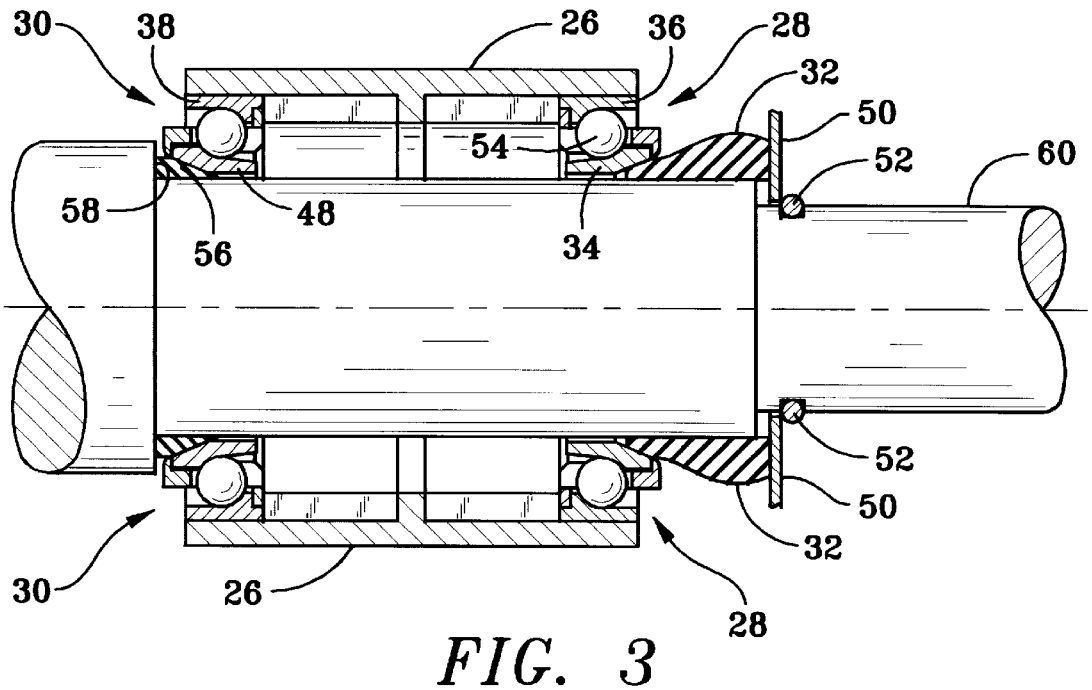
FIG. 3 is a sectional view of a shaft mounted within a housing, illustrating a second embodiment of the present invention.

FIG. 3 illustrates a second embodiment of the present invention including optional wedge-shaped isolator 56, formed of elastomeric polymer, between bearing inner ring 48 and annular shoulder 58 of shaft 60. Annular shoulder 58 has a radial surface engaging wedge-shaped isolator 56 to force the point of the wedge between bearing inner ring 48 and shaft 60 to center the shaft and prevent contact between angular contact bearing 30 and the shaft. This isolation of shaft 60 provides further reduction of transmitted noise and vibration to or from the shaft. Other elements of this embodiment are similar to those of the first embodiment.

Figure 4:
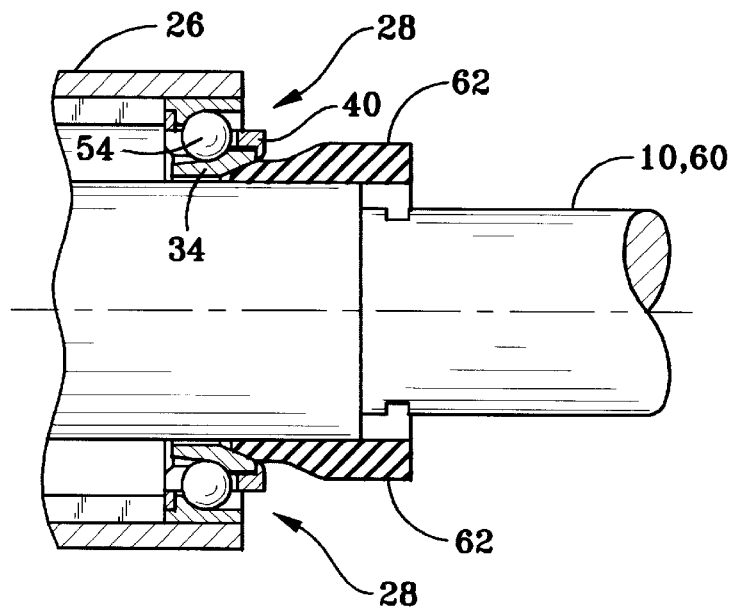
FIG. 4 is a sectional view illustrating an elastomeric polymer mounting ring of the embodiments of FIGS. 2 and 3 prior to axial compression of the mounting ring.

Mounting member 32 is shown in its undeformed cylindrical sleeve configuration 62 in FIG. 4.

Figure 5:
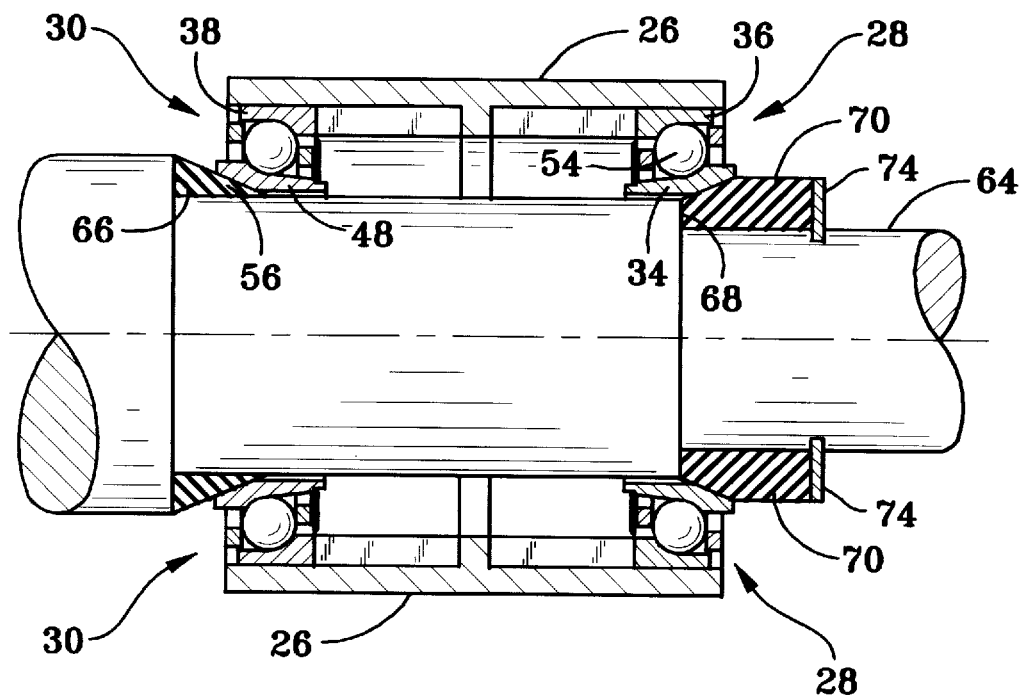
FIG. 5 is a sectional view of a shaft mounted within a housing, illustrating a third embodiment of the present invention.

FIG. 5 illustrates a third embodiment of the present invention similar to the second embodiment and including optional wedge-shaped isolator 56. Shaft 64 has annular shoulder 66 similar to annular shoulder 58 and includes a reduced diameter portion forming step 68 located radially inwardly of bearing inner ring 34. Step 68 allows mounting ring 70 to have a thicker radial section than mounting ring 32 while providing a wedge-shaped portion for engaging a radially outwardly tapered surface of bearing inner ring 34. When held by snap ring 74 as shown, mounting ring 70 is axially compressed and resiliently spread radially outwardly to provide a preload on angular contact bearings 28 and 30.

Although other elastomeric polymers may be used with the present invention, urethane is particularly suited as a material for this use because it is not readily compressible but resiliently deforms without changing its volume and without creep or relaxation under load. When mounting member 32 or 64 is "compressed axially", as described above, the volume remains substantially the same as it is deformed radially outwardly while maintaining contact with the shaft. As a result of this resilient deformation, a desired torque-to-rotate is maintained with less variation than can be obtained with prior art mounting arrangements while accommodating large axial displacements of the shaft and housing.

From the above description, it should be apparent that the present invention provides substantial improvements over prior art mounting arrangements with respect to reduction of noise and vibration and maintenance of uniform torque-to-rotate of the shaft relative to the housing, making the invention ideal for mounting automotive tilt steering columns. In addition, the present invention requires fewer parts than prior art mounting arrangements, results in simpler assembly and requires less axial space.

Having described the invention, what is claimed is:

1. An assembly comprising:
    a housing;
    an angular contact bearing having bearing balls between a bearing outer ring and a bearing inner ring, the bearing outer ring being mounted within the housing, the bearing inner ring having a central annular aperture;
    a shaft located concentrically within the central annular aperture of the bearing inner ring such that an annular space is provided between the bearing inner ring and the shaft;
    stop means mounted on the shaft; and
    a mounting ring, formed of elastomeric polymer, having a portion located within the annular space between the bearing inner ring and the shaft, the mounting ring being compressed axially between the bearing inner ring and the stop means such that the mounting ring is resiliently spread radially outwardly and a preload is exerted on the bearing balls.

2. The assembly according to claim 1, wherein the central annular aperture of the bearing inner ring has an outwardly tapered radially inner surface corresponding to an outwardly tapered radially outward surface of the portion of the mounting ring between the bearing inner ring and the shaft.

3. The assembly according to claim 2, further comprising a second angular contact bearing mounted within the housing and a tapered stop surface on the shaft, the second angular contact bearing abutting the tapered stop surface and having bearing balls preloaded by the axially compressed mounting ring.

4. The assembly according to claim 1, further comprising a second angular contact bearing mounted within the housing, a stop surface on the shaft and a wedge-shaped isolator formed of elastomeric polymer between the shaft and the second angular contact bearing and abutting the stop surface on the shaft such that centering of the shaft and reducing radial free play of the shaft with respect to the second angular contact bearing are facilitated.

5. The assembly according to claim 1, wherein the mounting ring is formed of urethane.

6. The assembly according to claim 1, wherein the shaft has a reduced diameter portion forming a step located radially inwardly of the bearing inner ring and wherein the mounting ring is located on the reduced diameter portion and against the step.

7. A method of mounting a shaft within a housing, the method comprising:
    mounting an angular contact bearing within the housing, the angular contact bearing having bearing balls between a bearing outer ring and a bearing inner ring, the annular contact bearing having an axis;
    positioning a shaft within the bearing inner ring such that an annular space is provided between the bearing inner ring and the shaft;
    positioning a mounting ring formed of elastomeric polymer over the shaft and against the bearing inner ring such that a portion of the mounting ring is within the annular space between the bearing inner ring and the shaft, thereby centering the shaft within the bearing inner ring and reducing radial free play of the shaft with respect to the bearing inner ring; and
    compressing the mounting ring axially, against the bearing inner ring, such that the mounting ring deforms and resiliently spreads radially outwardly and provides a preload on the bearing balls.

8. The method according to claim 7, further comprising mounting of a second angular contact bearing within the housing, the second angular contact bearing having bearing balls and being engageable with a stop surface on the shaft such that the axial compression of the mounting ring provides a preload on the bearing balls of the second angular contact bearing.

9. The method according to claim 8, further comprising positioning a wedge-shaped isolator formed of elastomeric polymer between the shaft and the second angular contact bearing and engageable with stop surface on the shaft, thereby facilitating centering of the shaft and reducing radial free play of the shaft with respect to the second angular contact bearing.

10. The method according to claim 7, further comprising the step of forming the mounting ring of urethane.

11. A method of mounting a shaft within a housing, the method comprising:
    mounting an angular contact bearing within the housing, the angular contact bearing having bearing balls between a bearing outer ring and a bearing inner ring, the annular contact bearing having an axis;

positioning a shaft within the bearing inner ring such that an annular space is provided between the bearing inner ring and the shaft;

positioning a mounting ring formed of elastomeric polymer over the shaft and against the bearing inner ring such that a portion of the mounting ring is within the annular space between the bearing inner ring and the shaft, thereby centering the shaft within the bearing inner ring and reducing radial free play of the shaft with respect to the bearing inner ring, the bearing inner ring having an outwardly tapered radially inner surface corresponding to an outwardly tapered radially outward surface of the portion of the mounting ring between the bearing inner ring and the shaft such that positioning the mounting ring within the annular space between the bearing inner ring and the shaft is facilitated; and compressing the mounting ring axially, against the bearing inner ring, such that the mounting ring deforms and resiliently spreads radially outwardly and provides a preload on the bearing balls.

* * * * *

UNITED STATES PATENT AND TRADEMARK OFFICE
CERTIFICATE OF CORRECTION

PATENT NO. : 5,826,987
DATED : October 27, 1998
INVENTOR(S) : Michael D. Beaman

It is certified that error appears in the above-identified patent and that said Letters Patent is hereby corrected as shown below:

Line 63- Continuation-in-part of Ser. No. 833,108, Apr. 4, 1997, abandoned.

Signed and Sealed this

Ninth Day of February, 1999

Attest:

Attesting Officer

Acting Commissioner of Patents and Trademarks